United States Patent
Chan et al.

(10) Patent No.: US 6,711,160 B2
(45) Date of Patent: *Mar. 23, 2004

(54) PACKET NETWORK TELEPHONE INTERFACE SYSTEM FOR POTS

(75) Inventors: Shun-Shing Chan, Fresh Meadows, NY (US); Nathan Junsup Lee, New City, NY (US); Kiyoshi Maruyama, Chappaqua, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,722

(22) Filed: Mar. 31, 1998

(65) Prior Publication Data

US 2001/0046237 A1 Nov. 29, 2001

(51) Int. Cl.$^7$ ............................. H04L 12/64; H04L 12/66
(52) U.S. Cl. ................... 370/354; 370/401; 379/88.17; 379/93.07; 379/900
(58) Field of Search ............................... 370/353, 354, 370/355, 356, 401, 466, 419; 379/88.17, 93.07, 900, 902

(56) References Cited

U.S. PATENT DOCUMENTS

| | | | | |
|---|---|---|---|---|
| 5,526,353 A | | 6/1996 | Henley et al. | |
| 5,761,280 A | * | 6/1998 | Noonen et al. | 379/93.27 |
| 5,815,503 A | * | 9/1998 | Li | 370/471 |
| 5,818,836 A | * | 10/1998 | DuVal | 370/389 |
| 5,883,941 A | * | 3/1999 | Akers | 379/93.08 |
| 5,884,262 A | * | 3/1999 | Wise et al. | 704/270 |
| 6,005,923 A | * | 12/1999 | Lee | 379/93.09 |
| 6,011,794 A | * | 1/2000 | Mordowitz et al. | 370/389 |
| 6,014,687 A | * | 1/2000 | Watanabe et al. | 709/204 |
| 6,050,823 A | * | 4/2000 | McClintic | 434/29 |
| 6,058,104 A | * | 5/2000 | Snelling et al. | 370/277 |
| 6,125,177 A | * | 9/2000 | Whittaker | 379/201.01 |
| 6,169,734 B1 | * | 1/2001 | Wilson | 370/352 |
| 6,259,708 B1 | * | 7/2001 | Cheng et al. | 370/201 |
| 6,377,570 B1 | * | 4/2002 | Vaziri et al. | 370/352 |
| 6,407,995 B1 | * | 6/2002 | Eryilmaz | 370/352 |

\* cited by examiner

Primary Examiner—Hassan Kizou
Assistant Examiner—Ahmad Elallam
(74) Attorney, Agent, or Firm—Scully, Scott, Murphy & Presser; Douglas W. Cameron

(57) ABSTRACT

The packet network phone unit is an interface between a telephone instrument and a packet network for enabling voice data to be communicated over the packet network. The unit also functions as a gateway between a packet network and a public switched telephone network, thereby interconnecting the networks and providing a public switched telephone network gateway to a packet network. When power is not supplied to the unit, a fallback switch automatically links the telephone instrument directly to the public switched network, bypassing the circuitry in the unit. The unit includes links to a plurality of external serial communications lines as well as an interface for connecting to a personal computer. The unit also includes an LCD driver and a display for displaying information such as a caller identification. The packet network phone unit also may function an answering machine/messaging system.

20 Claims, 7 Drawing Sheets

PACKET NETWORK TELEPHONE INTERFACE SYSTEM FOR POTS

TECHNICAL FIELD

This invention relates generally to communication systems, and more particularly, to a device for communicating voice data over a packet-based data network.

BACKGROUND ART

Currently, programs are available for digitizing the voice data as a person talks, and sending the digital data over the Internet. The existing programs are designed to run on a personal computer having a sound card with speakers and microphones. Accordingly, the only way to utilize the existing programs is to power on the personal computer before getting a voice connection through the Internet. In addition, the programs are capable of being used only in conjunction with a browser, for example, when navigating on the World Wide Web (Web) over the Internet. Moreover, the existing programs allow calling only those on the Internet having a compatible phone software, that is, a same type of compression scheme. They also do not automatically provide a capability for calling a party on the public switched telephone network, unless another connection is made to a "phone gateway".

The U.S. Pat. No. 5,526,353 by Henley et al. is a system and method for communicating audio data in a packet-based computer network where transmission of data packets through the computer network requires variable periods of transmission time. The system described in this patent requires a PC connection for delivering voice data over the packet network. It also does not include any other additional functions the present invention is able to provide.

SUMMARY OF THE INVENTION

The present invention is a standalone packet network phone interface unit which enables a plain old telephone instrument or a fax machine to be connected directly to a packet network. The present invention may be used without having a personal computer (PC), and provides, inter alia, features such as a plain old telephone set (POTS) interface to a packet network, a "phone gateway" capability, and an "IP phone" capability. Yet another feature of the present invention is an ability to connect to various serial communications mediums such as the cable TV channels and the integrated services digital network (ISDN). Such connections are useful for making telephone calls that bypass a local loop and/or local telephone company. Other features provided by the present invention include an ability to identify a caller id and display the information; a switch option to connect directly to a public switched telephone network (PSTN) line; and, an interface to connect to a data terminal equipment such as a PC.

The apparatus of the invention includes an analog to digital/digital to analog converter for converting voice signals to digital signals and vice versa; a signal processor for filtering and encoding the converted digital signals whose functions may also include operating as a modem; a network interface card for providing a physical connection to a network for transmitting and receiving packets of data from a network; a system controller for controlling and manipulating data, signals and their flow; and various additional interfacing devices for connecting to the external mediums, including a two-wire to four-wire converter for electrically connecting the telephone instrument. The system of this invention may further include an erasable and electrically programmable read only memory, said memory having capacity to be programmed remotely and dynamically.

The apparatus of the present invention is connected to a packet network and receives and transmits real time data such as voice samples from and to the network. The apparatus includes a network interface card and a controller for receiving packets from the network having an IP address corresponding to the network address of the apparatus. The controller strips off headers and trailers from each data packet received. The stripped data packets are generated into a stream of digital data which then is converted to analog audio data and transmitted to a telephone instrument. Similarly, audio data received from the telephone instrument is converted and compressed into digital data, assembled into packets with headers and trailers, and transmitted to the network via the network interface card. Accordingly, it is the object of this invention to provide a standalone interface between the POTS and the packet-based data network such that the apparatus of the present invention may be used as a terminal equipment of a packet data network phone system.

The present invention also functions as a one line PSTN gateway to the packet network by utilizing the data access arrangement (DAA). The DAA is directly connected to an analog line and interfaces with the PSTN. The DAA module performs, inter alia, over voltage protection, two-wire to four-wire signal conversion, ring detection, and off-hook on-hook detection and generation.

When the present system is functioning as a "phone gateway", a signal processor incorporated in the present invention performs dial tone detection and generation, dual tone multi-frequency (DTMF) tone generation and detection, voice compression and decompression, transmissions of off-hook signals to the DAA, and echo cancellation and suppression.

The system controller, also incorporated in the present invention, plays a pre-recorded message to announce to a caller on the PSTN side to press the destination number. The system controller then transfers the number to the telephony server on the digital data network to map it to an appropriate network address such as an IP address. The telephony server returns the network address to the system controller in the present invention to be used for further communication. If the call is initiated from the digital data network side, the system controller takes the destination number and passes it to the signal controller which then generates DTMF tones to make a call out to the PSTN. Accordingly, it is yet another object of this invention to provide a public switched telephone network gateway to a digital network phone system.

The apparatus of the present invention also provides means for connecting a data terminal equipment such as a PC. With a PC connection to the system of the present invention, many different feats may be accomplished. For example, a user may download via the PC a program for simultaneous voice data (SVD) function. The SVD function program enables the user with a single telephone line to speak on a telephone via Internet telephony while at the same time navigating among Web pages. In this way, the PC need not be equipped with a sound card, a microphone, or a speaker when making a phone call to the IP network. Yet, by downloading the SVD function program, the present system may effectively function as an "IP phone".

Other uses for connecting to a data terminal include information exchange for speed dial, automatic dialer, call detail records, dynamic firmware upgrade, caller identification record, voice mail, and normal everyday computer interface. Accordingly, it is a further object of this invention to provide an interface for connecting the present invention with a data terminal equipment such as a PC.

The present invention also includes a fallback switch for connecting a telephone instrument directly to the PSTN. This switch provides an option for connecting either to the PSTN line or a packet network. When the system of the present invention detects a power-off state, it automatically provides a direct connection from the telephone set to the PSTN line. That is, when a power is turned off on the apparatus of the present invention or if a power failure occurs, a phone call will be made directly through a telephone line, not any different from the way a plain everyday telephone call is made.

In addition, the system provides an option for the user to connect directly through the PSTN line instead of communicating through the packet network. That is, the user may choose to use a telephone set connected to the system to make a call via a conventional telephone line and the PSTN. The system includes a logic for determining whether a call will be made via a packet network or the PSTN. This option may be provided to the user by way of a predetermined number. For example, when the user dials #9 as his first digit when making a call, the system determines that a connection is to be made directly through the PSTN line, and activates the fallback switch. Accordingly, the fallback switch provides a direct connection to the PSTN line. Therefore, it is yet another object of this invention to provide an optional arrangement capable of making connection to either the PSTN or the packet network.

The present invention also provides a user with an option to connect to a number of serial communications lines by including a hub. The hub connects a network interface card to another external medium such as a cable TV system or an ISDN. Using a cable may get a user to a long distance carrier, which would bypass both the local loop and local telephone company, thus avoiding many bottleneck problems associated with a local loop. Having an ISDN provides an end-to-end digital connectivity with full-use, clear channels and a standardized interface. Accordingly, it is yet another object of this invention to provide a common bridge to a plurality of serial line communications interfaces.

The present invention includes a memory module capable of storing 60 minutes worth of voice data. Therefore, it is another object of this invention to provide an answering and messaging system for the digital packet data network phone system.

DESCRIPTION OF THE PREFERRED EMBODIMENT

Figure 1:
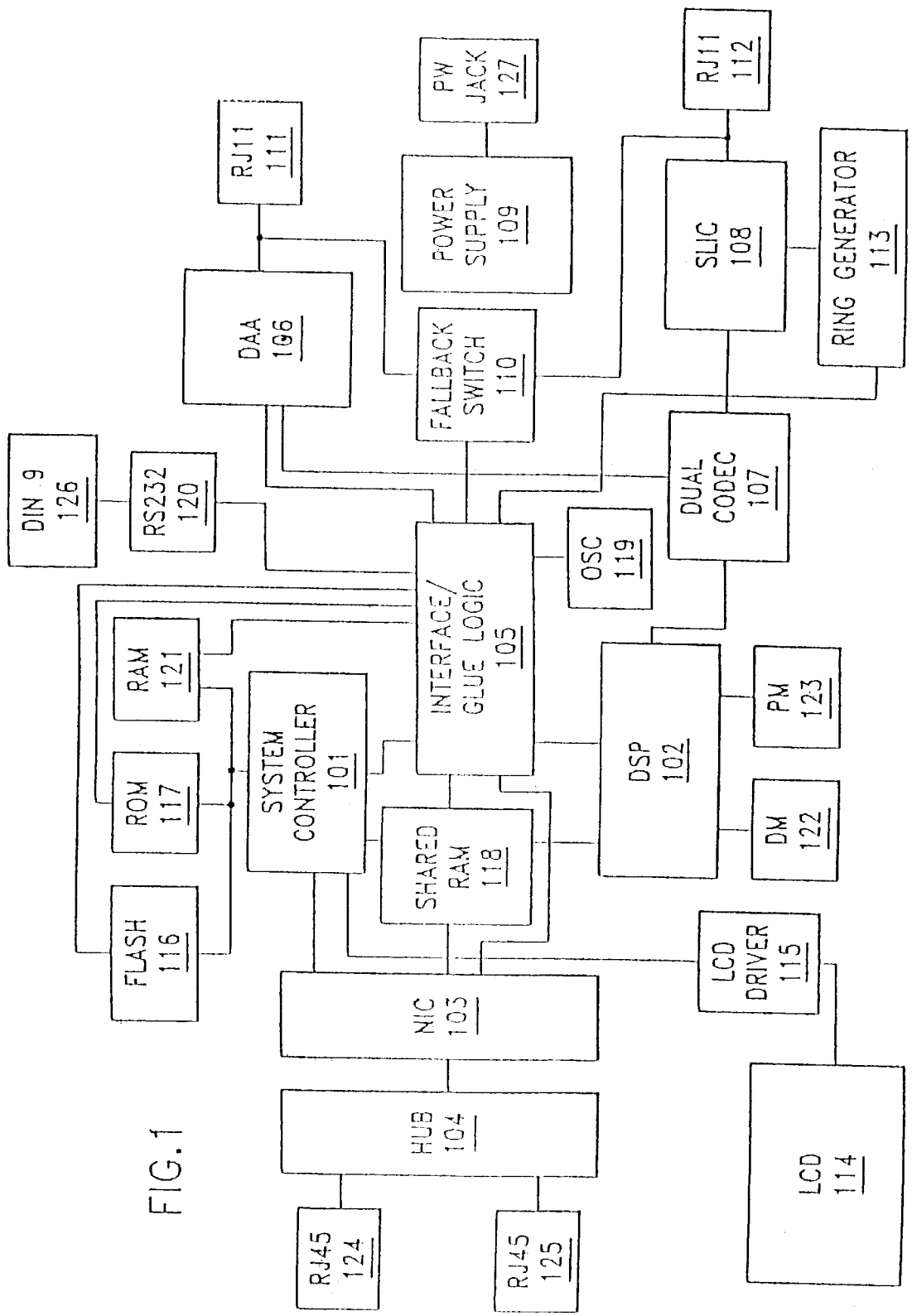
FIG. 1 is a block diagram illustrating internal interconnections, including the present invention.

FIG. 1 is a block diagram illustrating an exemplary layout of the internal components of the present invention, a packet network telephone interface system for POTS, in its preferred embodiment. The main components shown in FIG. 1 are: a system controller 101; a digital signal processor (DSP) 102; a network interface circuit (NIC) 103; a data access arrangement (DAA) 106; a subscriber line interface circuit (SLIC) 108; a dual code/decoder (dual CODEC) 107, one coupled to the SLIC (108) and another coupled to the (DAA) 106; an LCD display 114; a flash memory 116; a read only memory (ROM) 117; a random access memory (RAM) 121; shared memory 118; DSP data memory (DM) 122; DSP program memory (PM) 123; a fallback switch 110; a three way hub 104; an oscillator 119; power supply circuits 109; an RS232 driver 120; an interface/glue logics 105; and various connectors 111, 112, 124, 125, 126, 127. Although a single powerful processor can be adapted instead of having a separate system controller and digital signal processor, the preferred embodiment in FIG. 1 is shown as implemented using two separate processors. Such a separation clearly defines functional boundaries and enhances determination and easy isolation of potential problems.

Typically, a telephone instrument is connected to the SLIC 108 via the RJ11 112. The SLIC 108 receives a voice signal from the telephone instrument and performs functions such as detecting and generating off hook and on hook states. The SLIC 108 is coupled to the dual CODEC 107. The dual CODEC 107 converts the voice signal into digital data. The digital signal processor (DSP) 102 generally filters, encodes, compresses/decompresses, and performs echo cancellation and suppression on the data. Additional functions of the DSP 102 include dial tone detection and generation, DTMF detection and generation, transmitting off-hook signals to the DAA, and operating as a modem. The data is also made available to the system controller 101 via the interface/glue logic 105. The system controller 101 and the network interface card (NIC) 103 together filters and packages data into data packets, adds headers and trailers, including error check bits, for the appropriate communications protocols, for example, TCP/IP. The digitized voice data is then transmitted to the packet network via the NIC 103 and the connection at RJ45 plugs 124, 125.

Similarly, when a packet data is received by the present invention via the connections at RJ45 plugs 124, 125 and the NIC 103, the system controller 101 and NIC 103 together filters out data packets received, and strips off headers and trailers while checking the CRC error. The DSP 102 also processes the data, decompressing the data when voice compression is detected. The dual CODEC 107 converts the processed digital signals into voice signals for transmission to a telephone instrument connected to the SLIC 108 via the RJ11 112. At the same time the DSP 102 drives the SLIC 108 by performing a call process tone generation.

The system controller 101 also controls the host interface 126, LCD display 114, updating the FLASH memory 116, as well as the state machines for the telephone states. The minimum set of telephone states include idle, dial tone, DTMF detection, busy tone, ring back tone, voice, and ring. The system controller 101 switches the states based on telephone events such as off-hook detection, on-hook detection, DTMF tone detection, busy detection, not busy detection, circuit connected, call terminated, ring start, and ring stop.

The system controller 101 is generally responsible for handling all communication protocol stacks for adhering to the protocol, for example, TCP-UDP/IP protocols, while managing the data flow. The system controller 101 together with NIC 103 handles all the layers of the communication protocols including point to point protocols (PPP) or serial line internet protocol (SLIP) and obtains the internet protocol (IP) address if a permanent address is not available. For example, if a permanent network address for the unit of the present invention is not assigned, the system controller 101 acquires a temporary address from an address pool by adhering to protocols as PPP. Once the network address is acquired, NIC 103 exchanges its application addresses, also known as "port address", with the server if a permanent port address is not assigned. The combined address of the network and the port addresses together is often called socket address. The NIC 103 receives only the packet that contains its network address and application address when it detects the incoming real time data from the network.

The telephone signaling message preferably uses a distinctive application address from the voice samples so that the NIC 103 can easily distinguish the voice from the signal. In the preferred embodiment, guaranteed protocols such as TCP are used to deliver the signaling, while datagram such as UDP may be adapted for voice samples.

The configuration of the data format may be exchanged through a proper handshake protocols such as H.323 over the network. A fixed format can also be utilized by configuring the format via the PC interface. In the preferred embodiment, the information about the duration of the packet and the type of compression scheme used is exchanged via the proprietary protocols over the network. The default setting is set initially at the manufacturing time and may be modified via the PC interface over an RS232 serial link 120.

In the preferred embodiment of the present invention, the system controller 101 reads instructions stored in a ROM 117. These instructions include dynamically updating programs and data in the FLASH memory 116. The system controller 101 for its subsequent processing accesses the updated programs and data in the FLASH memory 116. In addition, the updated programs and data are downloaded to the DSP program memory (PM) 123 and data memory (DM) 122 when the system is powered on. The DSP 102 reads PM 123 and DM 122 for its processing instructions and data access.

The NIC 103 is connected to an interface/glue logic 105 that supports direct memory access to the shared memory 118. In the preferred embodiment, an Ethernet 10baseT NIC 103 is used, however, the disclosure does not limit to the Ethernet only. A token ring or an asynchronous transport module (ATM) network interface circuit and associated controllers may be substituted. A three way hub 104 is added to the unit in order to reduce the users' burden of requiring an external hub in case a link to an external communications line is needed. By having one end of the three way 10baseT Ethernet hub 104 connected to a 10baseT Ethernet NIC 103, it is possible to have a three way connection, for example, among a cable modem via serial connection 124/125, a personal computer and the present invention.

The communications link between a data terminal, for example, a personal computer, and the apparatus of the present invention is shown in FIG. 1 as linked via a RS232 serial link 120. However, other links are also possible. Depending on the throughput required on the link, any other serial link such as a universal serial link, an IEEE 1394 link, or a parallel links such as IEEE P1284 may be adapted.

The interface/glue logic 105 is designed to assist the NIC 103 to transfer data from and to the shared memory 118 and also has Universal Asynchronous Receive and Transmit (UART) compatible serial interface logic for the host interface 126. Generally, the system controller 101 accesses the interface/glue logic 105. The interface/glue logic 105 also includes message interchange logic to exchange messages between the DSP 102 and the system controller 101. Also included in the interface/glue logic 105 is a clock generator which takes a clock from a oscillator 119 as a master clock and divides it down to various rates required by each components in the unit. The system interface/glue logic 105 includes a logical connection between the system controller 101 and the LCD driver 115 such that the system controller 101 may display short messages on a strip of LCD 114. The messages displayed on the LCD 114 in the preferred embodiment are caller identification and the system status.

The shared memory 118 may be used as a message passing medium between the system controller 101 and the DSP 102. For example, when data is received through the network interface card, the system controller 101 handles the received data first, then the system controller 101 writes the received data onto the shared memory 118. The DSP 102 can then directly read the shared memory 118 to retrieve the system controller 101 processed data. In addition, the system controller 101 may access the data ready for transmission, written on the shared memory 118 by the DSP 102, and attach TCP-UDP/IP headers and trailers before transmitting to the network.

The functions of DSP 102 include compressing and decompressing voice data, DTMF detection, echo cancellation as well as call process tone generation when driving the SLIC 108. The DSP is also used to implement the data pump for a data modem when the network is connected through an analog phone line. The unit may be connected to an analog line on the PSTN via the DAA module 106, which is connected to a dual CODEC 107. The DAA module 106 handles any over voltage protection, 2-wire to 4-wire conversion, ring detection, and on-hook and off-hook detection and generation.

The two wire on the RJ11 111 connector on the DAA side are connected to the corresponding two wires on the RJ11 112 connector on the SLIC 108 side via a fallback switch 110. When a power is shutdown on the unit or a power failure occurs, the fallback switch 110 connects the two RJ11 111, 112 connectors. The fallback switch 110 also connects the two RJ11 111, 112 connectors upon a software command from the system controller. Thus, the fallback switch 110 may be used to connect the telephone instrument on the SLIC 112 side to the PSTN in case of a power failure or a packet network failure. In addition, the fallback switch 110 supports optional arrangements for connecting either to the PSTN or the packet network even when the power supply is available.

In the preferred embodiment, the present invention may also be used as a one line digital packet data network to PSTN gateway. In this mode, the DSP's 102 functions include voice compression/decompression, echo cancellation, DTMF tone generation and DTMF tone detection. The system controller 101 plays pre-recorded message to announce to a caller on the PSTN side to press the destination number, then transfers the number to the telephony server on the digital packet data network. The telephony server then maps the number to an appropriate IP address and returns the IP address to the apparatus of the present invention. The apparatus of the present invention then uses the IP address for further communication. When the call is initiated from the digital packet data network side, the system controller 101 takes the destination number and passes it onto the DSP 102 so that the DSP 102 can call out to the PSTN by generating the DTMF tones.

The unit contains a large enough memory to store at least 60 minutes of compressed voice so that it can be used as an answering machine.

The dual CODEC 107 is also connected to a subscriber line interface circuit (SLIC) 108 to convert 2 wire telephone signals to 4 wire signals. The SLIC 108 is connected to a ring generator 113 for generating a telephone ring on the instrument.

The apparatus of the present invention is powered via a power jack 127 by a power supply that converts the household AC power to the required DC voltage levels. When the AC power is not readily available, the unit may also be powered by a power supply that converts backup battery DC power to the required DC voltage.

The unit of the present invention may be connected locally or remotely to a data network in a similar manner as any other data terminal equipment such as a PC. overview configuration of the network component interconnections, including the present invention. In For example a workgroup may include a plurality of nodes all connected to an external hub which is used to link together all the nodes in a workgroup. The plurality of nodes may further include the units of the present invention with telephone instrument connections. In addition, the unit may be linked to the PSTN via a line connecting RJ11 plug on the unit 111 and a socket in a wall for physical telephone line connection. The hub may be linked to a router which provides a bridge connection between a workgroup and an outside network. Through this configuration, the data may travel from and to the various networks. For example, a packet data originating at some point in the network travels via the router, the hub, the unit of the present invention, to the PSTN, terminating in a node located somewhere in the PSTN. Similarly, a packet data originating in the network follows the same path and terminates at the telephone instrument connected at the unit of the present invention. Reverse path for both situations are, of course, possible. A direct link from the unit to a PC via connections such as RS232 interface is also made possible by the present invention.

Figure 2:
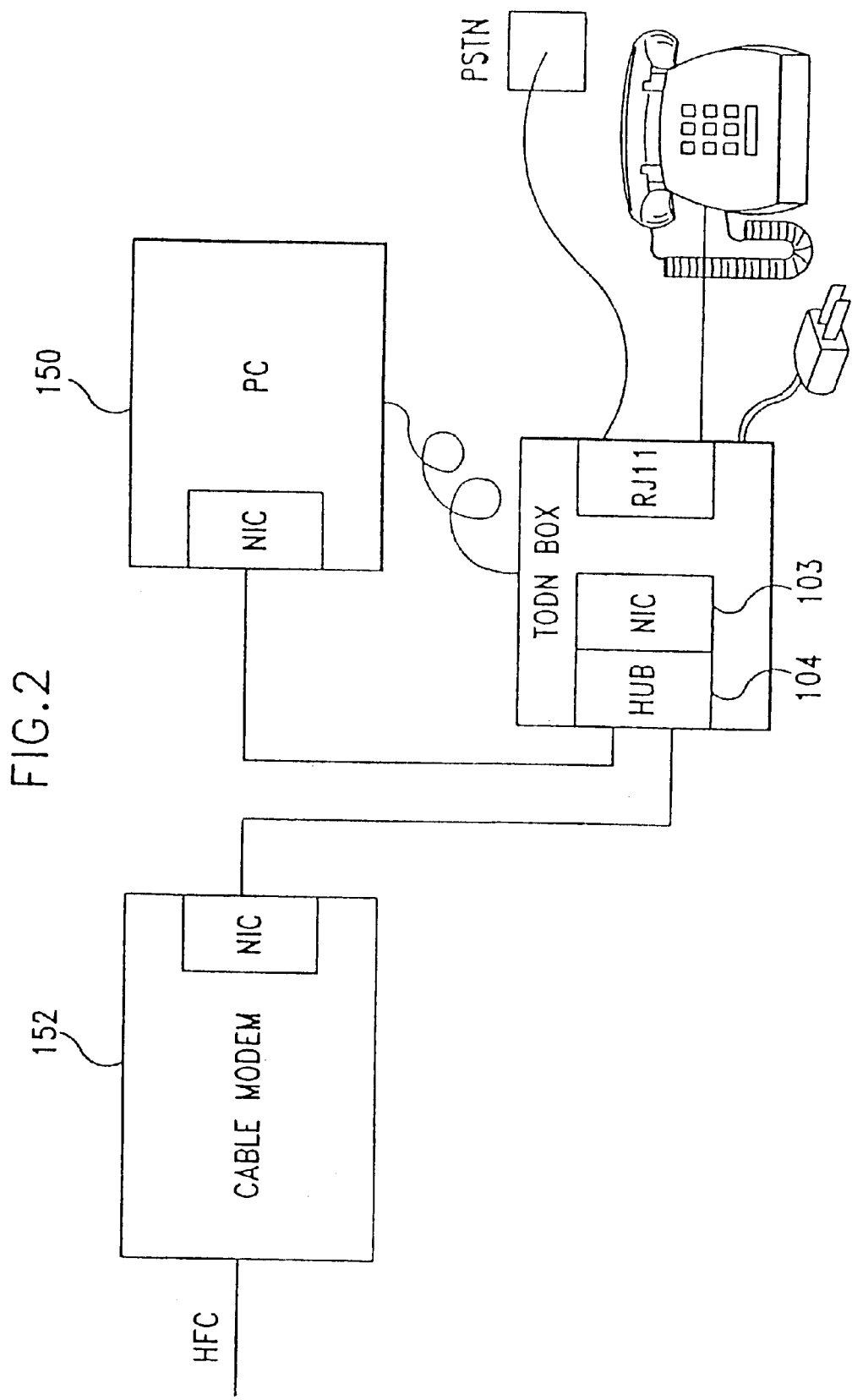
FIG. 2 is an exemplary illustration showing connections to a packet network via the three-way internal hub.

FIG. 2 is an exemplary illustration showing connections to a packet network via the three-way internal hub. The hub 104 connects the NIC 103 in the unit with a PC 150 and also a cable modem 152 via two RJ45 plugs. With the illustrated connection, a telephone voice communication via cable line is made possible as explained previously in reference to the FIG. 1. The cable modem 152 in FIG. 2 is shown only as an example and not as a limitation. Any other network connecting medium capable of carrying packet data may be linked to the hub 104.

Figure 3:
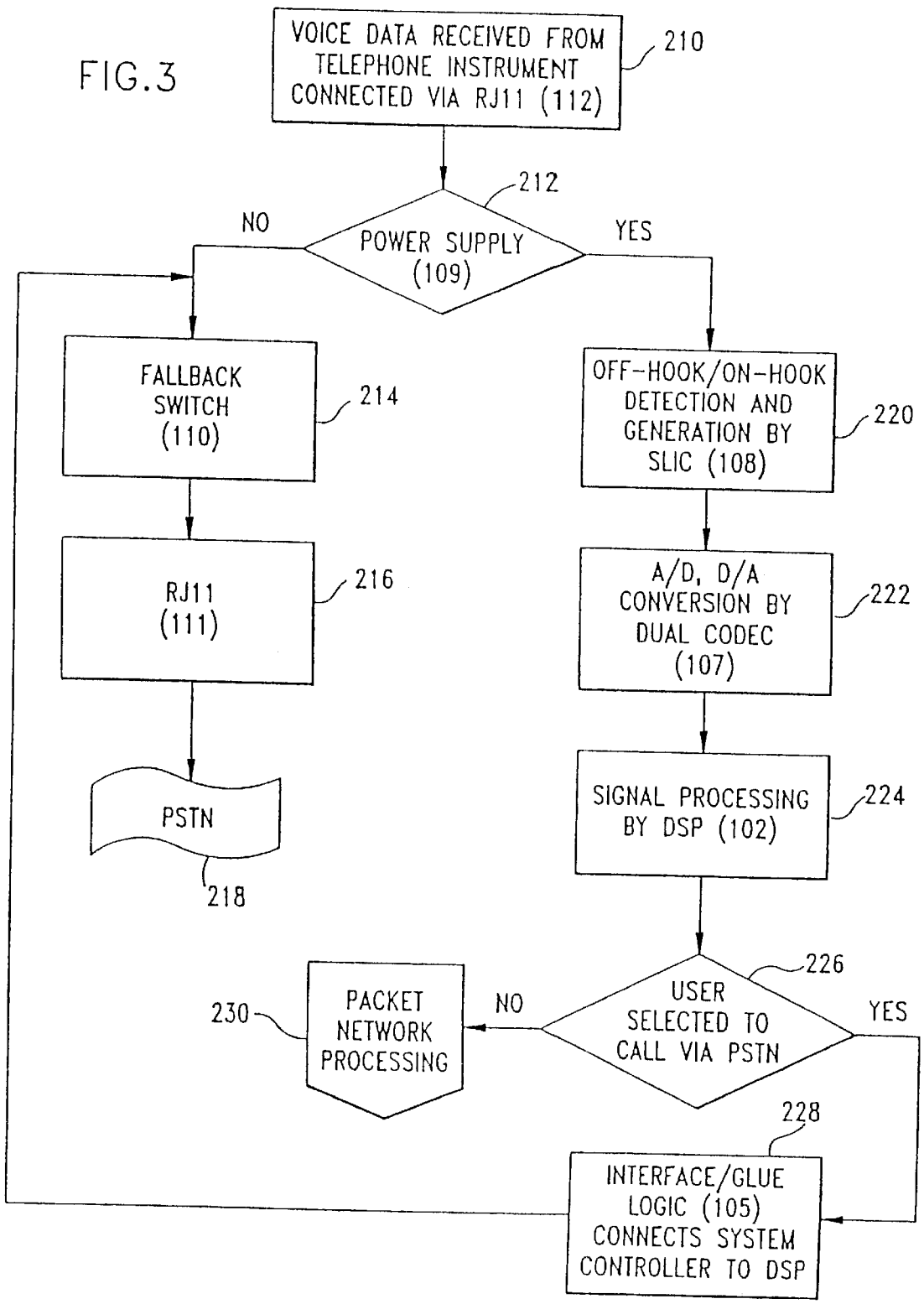
FIG. 3 is a flow diagram illustrating a possible path for data and signal flow in the components of FIG. 1 when power supply is down.

FIG. 3 is a flow diagram illustrating a possible path for data and signal flow in the circuit components of FIG. 1 when a power supply is down. In step 210, voice data is received into the unit via a telephone instrument connected to the unit at RJ11 plug 112. In step 212, a test is made to determine whether a power supply is available. In step 214, when no power is supplied to the unit, a fallback switch 110 automatically links a line from the RJ11 plug 112 to the other RJ11 plug 111. In step 216, the RJ11 plug 111 is physically connected to the PSTN, enabling voice data to be communicated via the PSTN 218.

FIG. 3 also illustrates a logical data and signal path in the circuit components in FIG. 1 when a power supply is available, but a user optionally elects to link the telephone instrument directly to the PSTN. In step 220, SLIC 108 whose functions include detecting and generating off-hook and on-hook telephone states, detects off-hook condition. In step 222, the dual CODEC 107, utilized for performing analog to digital and digital to analog signal conversions, generates digital signals from the audio data received via the telephone instrument at step 210. In step 224, the DSP 102 whose functions include dial tone detection, DTMF detection and generation, voice processing including voice compression and decompression, modem processing, and transmitting off-hook signals to DAA, processes the converted digital signals accordingly. In step 226, the DSP 102 determines whether an option was selected for a direct connection to the PSTN. In step 228, the DSP 102 informs the system controller 101 via the interface/glue logic 105 the selected option to establish a direct line to the PSTN. The system controller 101, again via the interface/glue logic 105, activates the fallback switch which establishes a direct connection as explained previously.

In step 226, if at DSP 102 it is determined that the audio data is to be communicated via packet network, a normal proceeding continues in step 230, as will be explained in reference to FIG. 4 and FIG. 5.

Figure 4:
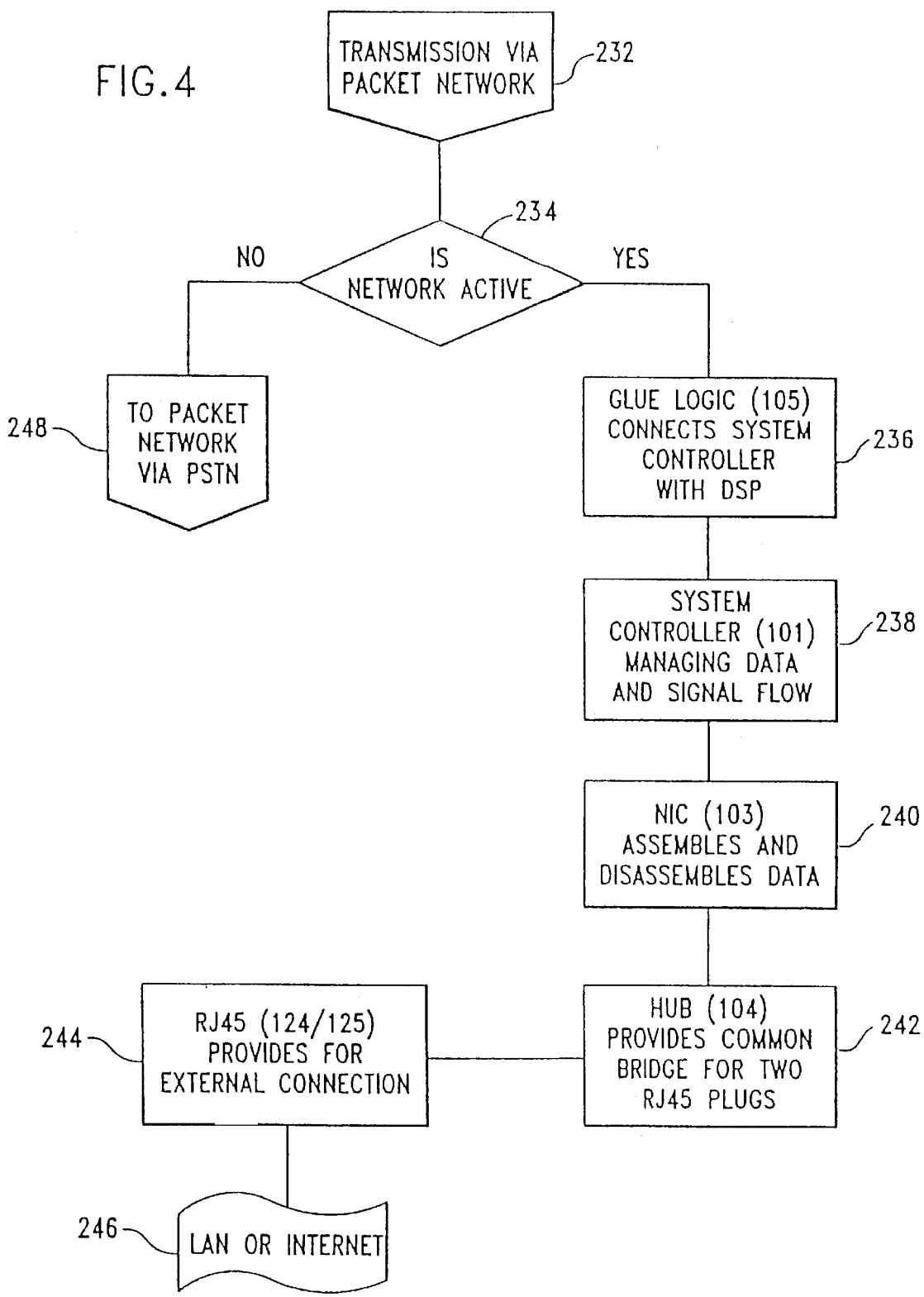
FIG. 4 is a flow diagram illustrating a possible path for data and signal flow in the components of FIG. 1 for communicating audio data in a packet-based network when the unit in FIG. 1 is connected via a LAN/Internet.

FIG. 4 is a flow diagram illustrating a possible path for data and signal flow in the components of FIG. 1 for communicating audio data in a packet-based network when the unit in FIG. 1 is connected via a LAN/Internet. At 232, transmission via a packet network continues from 230 in FIG. 3. In step 234, a query is made to determine whether an active network connection via the NIC 103 exists. When network is not active, communication to the network will be made via the PSTN as shown in step 248 and processing will continue as will be explained in reference to FIG. 5. If a network connection exists, the glue logic 105, in step 236, establishes itself as an interfacing medium for connecting logics between the system controller 101 and the DSP 102. In step 238, the system controller 101 whose functions include handling network protocol operations, controlling data and signal flows, correcting error, and managing simultaneous voice and data flow, prepares the data accordingly. In step 240, the NIC 103 assembles the data into packets, readying the packets for transmission via the NIC 103. In step 242, the hub 104 provides a common bridge among the NIC 103 and the two RJ45 plugs at 124 and 125 in FIG. 1. The two plugs in step 244 then provide outlets to external communications lines, whereby the packetized data travels to its destination node via the packet network.

The data and signal flow described above refers to one direction, namely, voice data to packet network. Of course, the packet data received into the system would follow the equivalent logic flow but in reverse order whereby packets are received at either of the two RJ45 plugs 124, 125 in FIG. 1, disassembled and converted to analog signals to be transmitted to their destination nodes via the two RJ11 plugs at 111 and 112 in FIG. 1.

Figure 5:
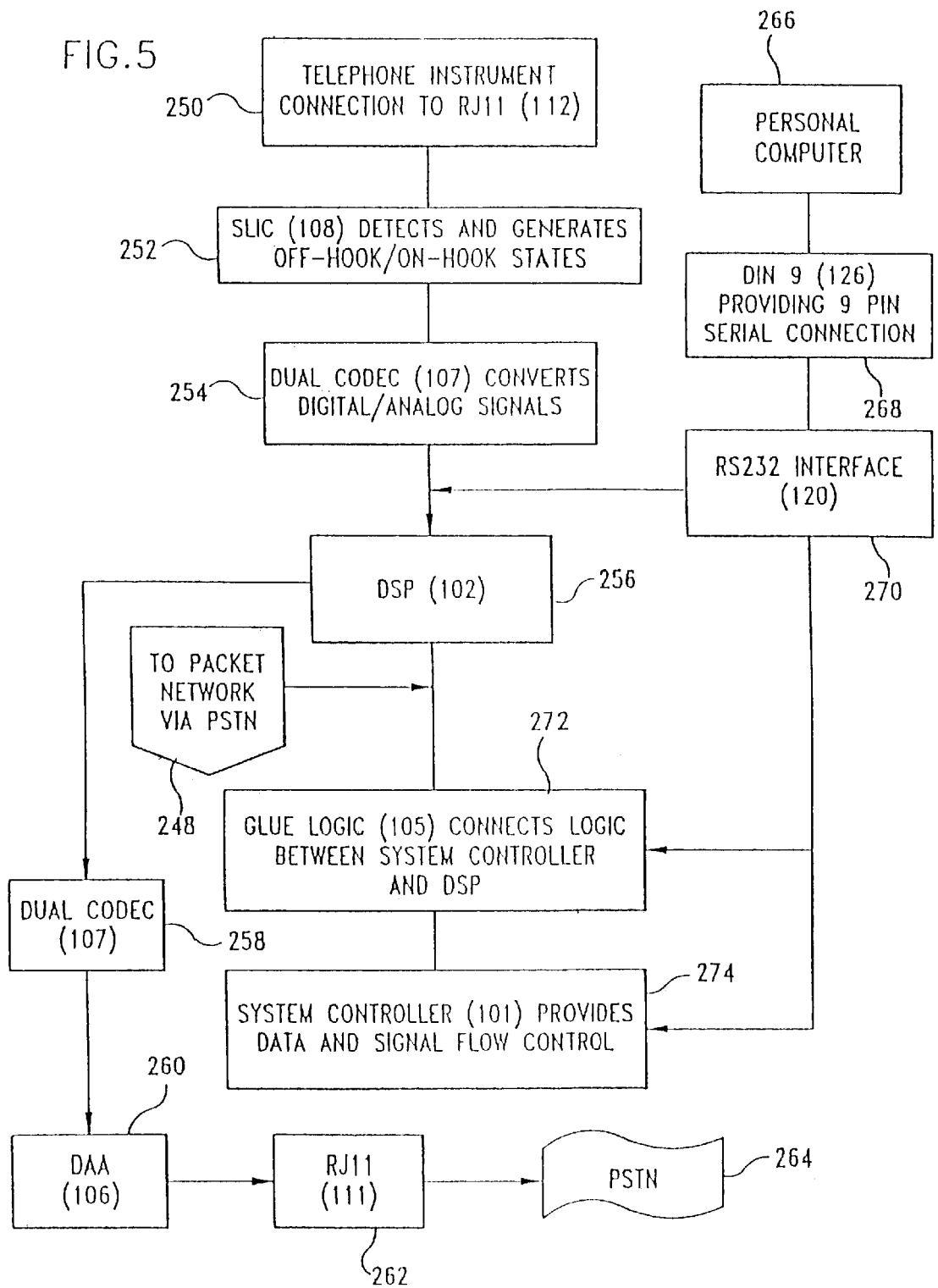
FIG. 5 is a flow diagram illustrating a possible path for data and signal flow in the components of FIG. 1 for communicating audio data in a packet-based network when the unit in FIG. 1 is connected via the PSTN.

FIG. 5 is a flow diagram illustrating a possible path for data and signal flow in the circuit components of FIG. 1 for communicating audio data in a packet-based network when the unit in FIG. 1 is connected via the PSTN. In step 250, voice data is received into the unit via a telephone instrument connected to the unit at RJ11 plug 112. In step 252, SLIC 108 whose functions include detecting off-hook state, processes accordingly. In step 254, the dual CODEC 107, converts the audio data received via the telephone instrument at step 210 to digital signal. In step 256, the DSP 102, in addition to performing its other functions, operates as a modem. In its capacity as a modem, the DSP modulates and demodulates the filtered digital signal, transmits off-hook signal to the DAA for communications via the PSTN. In step 258, the dual CODEC 107 converts the digital signal back to analog signals. In step 260, the DAA 106, a telephone-system protective device, is used to interface to the telephone network shown in step 264. The telephone network is connected through the RJ11 plug 111 in step 262.

FIG. 5 also illustrates an example logic flow among the components of the unit in FIG. 1 when a PC is connected to the unit via DIN9 connection and RS232 interface as shown in steps 266, 268, 270. The PC connected via RS232 interface interacts with the system controller 101 and the DSP 102 through a connection to the glue logic 272 as shown in step 272, 256, 274. The DSP 102 may again acts as a modem between the PC and the PSTN.

The processing performed in steps 272, 274, 256, 258, 260, 262, and 264 as described previously also follows the step 248 in FIG. 4, when the network connection via LAN/Internet is not available.

Figure 6:
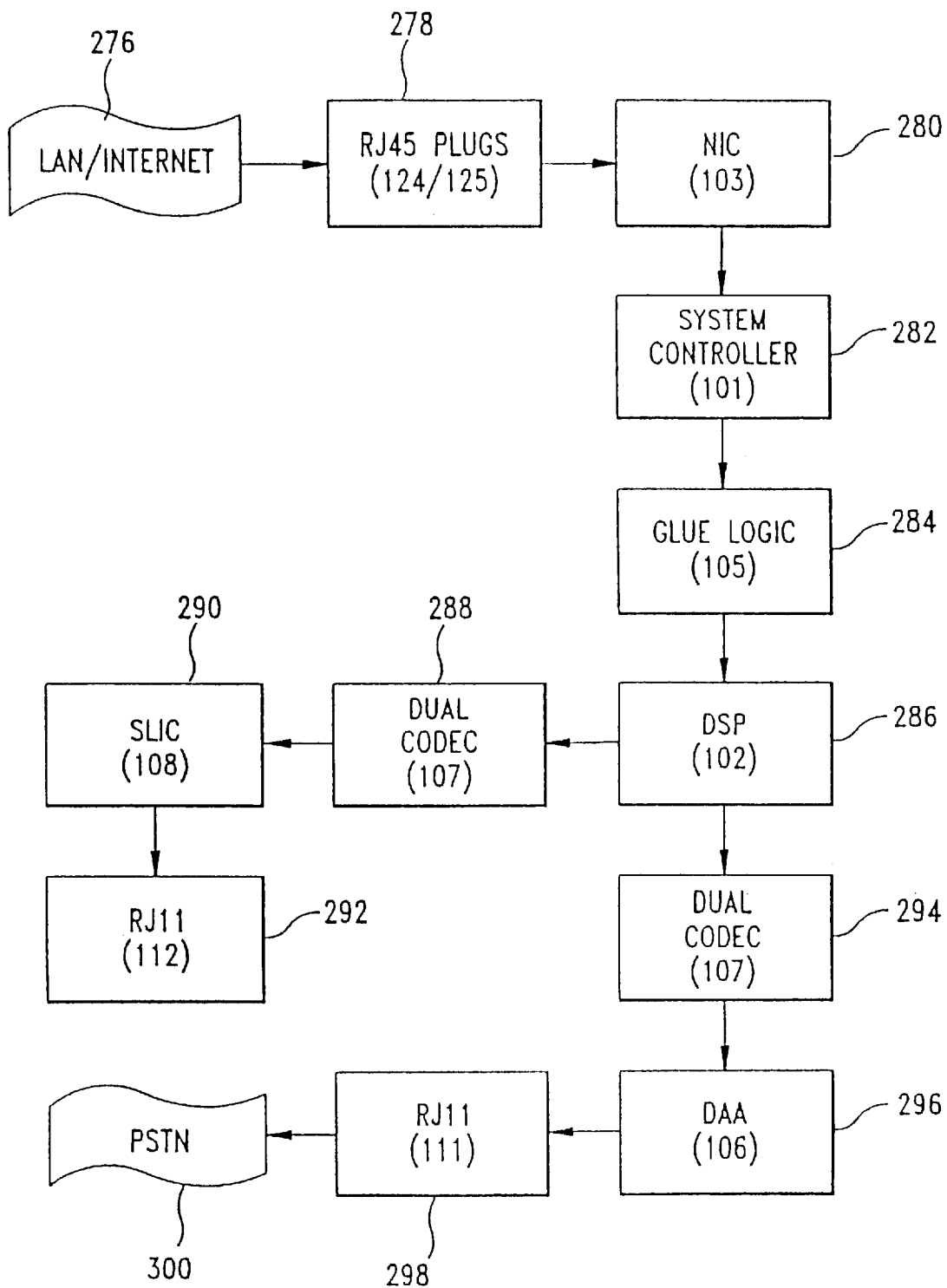
FIG. 6 is a flow diagram illustrating a possible path for data and signal flow in the components of FIG. 1 when the unit in FIG. 1 is functioning as a medium for interconnecting packet data network and the PSTN, that is, a "phone gateway".

FIG. 6 is a flow diagram illustrating a possible path for data and signal flow in the components of FIG. 1 when the unit in FIG. 1 is functioning as a medium for interconnecting packet data network and the PSTN, for example, a "phone gateway". In FIG. 6, the packets of data are received into the NIC 103 in step 280 via the RJ45 plugs 124, 125 in step 278 from the LAN/Internet network in step 276. In step 280, NIC 103 disassembles the packets into digital signals while in step 282, the system controller 101 handles protocol formatting and error checking. In step 284, the glue logic functions as a logical connector between the system controller 101 and the DSP 102. In step 286, the DSP process the digital signals, performs dial tone detection, DTMF generation and detection, and voice compression and decompression when detected. In step 288, the dual CODEC 107, one of which is coupled with the SLIC 108 converts digital signals into analog signals. In step 290, the SLIC 108 whose function includes on-hook, off-hook detection and generation, detects an appropriate condition and triggers a ring generator 113 in FIG. 1 when the telephone instrument connected via the RJ11 112 in step 292 is available for establishing a conversation. Any subsequent exchange of data from the telephone instrument connected at RJ11 112 and the LAN/Internet network takes place as described.

Alternatively, the digital signal processed data may be processed as shown in step 294 through the dual CODEC, one of which is coupled to the DAA 106. The DAA 106, in step 296, interfaces on-hook, off-hook states with a telephone switching system via the RJ11 plug 111 in step 298 for communications over the PSTN in step 300. The processing described effectively allows the unit of the present invention to function as a "phone gateway" between the packet network and the PSTN.

Figure 7:
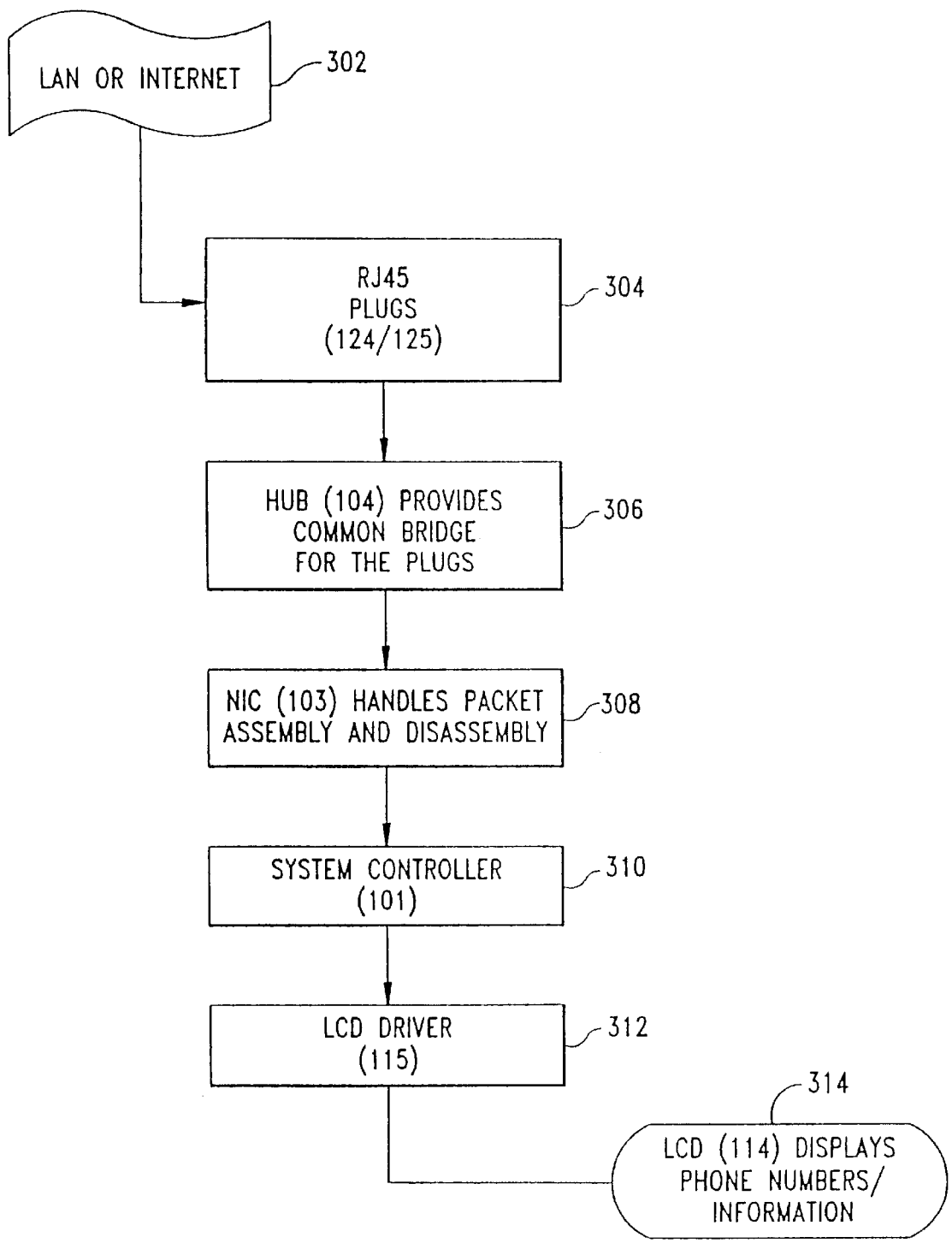
FIG. 7 is a flow diagram illustrating a possible path for data and signal flow in the components of FIG. 1 for displaying information such as a caller id.

FIG. 7 is a flow diagram illustrating a possible path for data and signal flow in the components of FIG. 1 when displaying information such as a caller id. In steps 302 and 304, packet data enters the unit via the RJ45 plugs 124, 125. Step 306 shows how the hub 104 may function as a common bridge connecting the two RJ45 plugs 124, 125 with the NIC 103. The NIC 103 in step 308 then disassembles the packet data while the system controller in step 310 performs error checking and strips off appropriate protocol header and trailers. In addition, the system controller 101 performs information mapping with received phone number. In step 312, the information and phone number are relayed to the LCD driver 115 which displays the information on the LCD 114 in step 314.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A packet network telephone interface system for enabling communications with plain old telephone sets over a plurality of telecommunications networks, said system comprising:

telephone input/output units for receiving signals from and transmitting signals to a plain old telephone set and a public switched telephone network;

a network connection input/output unit for receiving data packets directly from and transmitting data packets directly to a data packet based network having a defined network protocol;

a processing subsystem including a network interface card, located in series between the network connection unit and the telephone input/output units, for converting signals from the plain old telephone set into data packets in accordance with said defined network protocol for transmission over the data packet based network, and for converting data packets from the data packets based network into signals suitable for transmission to the plain old telephone set, the processing subsystem including;

at least one dual coder/decoder connected to the input/output units for converting analog signals into digital signals, and for converting digital signals into analog signals;

switching means to determine whether signals from the plain old telephone are transmitted to the telephone network, or to the network interface card for conversion into data packets for transmission to the data packet based network.

2. The system as in claim 1, wherein said processing subsystem comprises:

a digital signal processor coupled to said at least one coder/decoder.

3. The system as in claim 1, wherein said system further includes a ring generator for generating ringing signals; and said at least one input/output unit includes at least one receptacle plug for receiving connection from a telephone instrument, said receptacle plug further coupled to a subscriber line interface card, whereby said subscriber line interface card detects and generates off hook and on hook states of said telephone instrument, said subscriber line interface card further activating said ring generator for generating ringing signals for said telephone instrument.

4. The system as in claim 1, wherein said system triggers automatic connection to the public switched telephone network when said system detects a group of predetermined conditions.

5. The system as in claim 1, wherein one of said plurality of interface devices includes a data access arrangement for interfacing to the public switched telephone network and one of said at least one external medium is said public switched telephone network, whereby a telephone call can be made out to said public switched telephone network from said system via said data access arrangement.

6. The system as in claim 5, wherein said system further includes means for enabling said telephone call to be made via said data access arrangement to said public switched telephone network when said system receives data packets via said at least one network interface unit.

7. The system as in claim 1, wherein one of said plurality of interface devices includes a device for connecting a data terminal equipment to said system and said at least one external medium is a data terminal equipment.

8. The system as in claim 7, wherein said data terminal equipment includes a personal computer, far downloading programs to said system from said personal computer.

9. The system as in claim 1, wherein one of said plurality of interface devices includes an LCD driver and said at least one external medium is an LCD, whereby said system may display a plurality of information, which plurality of information includes a caller identification number.

10. The system as in claim 1, wherein one of said plurality of interface devices includes a hub coupled to said network interface unit for connecting said system to a plurality of external communications lines.

11. The system as in claim 10, wherein said hub enables said system to be connected to a packet network.

12. The system as in claim 1, wherein said system further includes a memory device and means for storing voice data messages in said memory device, said means for storing also enabling a party to retrieve said voice data messages, whereby said system can function as a telephone answering/messaging system.

13. The system as in claim 1, further including an erasable and electrically programmable read only memory, said memory having capacity to be programmed remotely and dynamically.

14. An interface system according to claim 1, wherein:
the telephone input/output units include
   i) a first input/output unit for connecting the interface system with the plain old telephone set, and
   ii) a second input/output unit for connecting the interface system with the public switched telephone network; and
the network connection input/output unit includes a third input/output unit for connecting the interface system with said one of the packet based networks.

15. A method of establishing and maintaining voice communications with POTS over a plurality of communications network services, which plurality includes the PSTN and packet-based networks, said method comprising the steps of:
receiving analog voice signals from a POTS;
establishing a direct link over said PSTN network service when a power supply is not available;
using a telephone interface unit to determine whether to communicate directly over the PSTN or directly over one of the packet-based networks, said one of the networks having a defined network protocol;
preparing said analog voice signals for communications over the determined communication network service including the step of, when preparing said analog signals for communication over said one of the packet-based networks, using a processing subsystem including a network interface card located in the telephone interface unit, to convert the analog signals into data packets in accordance with said defined network protocol.
receiving data from said the determined communication network services;
using a dual coder/decoder, connected to a plurality of input units, a plurality of output units and to the network interface card, to convert streams of digital signals into analog signals and to convert analog signals into digital signals; and
preparing said received data for communications to said POTS.

16. The method according to claim 15, wherein said step of preparing said analog voice signals includes the steps of:
digitizing said analog voice signals;
inserting communications protocol control codes; and
assembling said digitized voice signals into packets,
whereby if said at least one of said plurality of communication network services is packet-based network, said packets are communicated over said packet-based network.

17. The method according to claim 15, wherein said step of preparing said data for communications to said POTS includes the steps of:
disassembling packets of data into stream of data; and
converting said stream of data into analog voice signals,
whereby if said at least one of said plurality of communication network services is packet-based network and said data includes packets of data, said analog voice signals are communicated over said POTS.

18. The method according to claim 15, wherein said step of establishing a direct link over said PSTN network services is performed when a party selects an option to communicate directly to said PSTN network.

19. The method according to claim 15, wherein said step of establishing a direct link over said PSTN network services includes the step of establishing said direct link upon the occurrence of one of a group of predetermined conditions.

20. An interface system according to claim 14, wherein:
the switching means includes a fall-back switch having
   i) a first state for connecting together the first and second input/output units for transmitting signals from the plain old telephone set to the public switched telephone network, and
   ii) a second state for connecting together the first and third input/output units for transmitting signals from the plain old telephone set to the packet based network; and
the fall back switch automatically changes from the second state to the first state upon the occurrence of one of a set of predefined conditions.

* * * * *

UNITED STATES PATENT AND TRADEMARK OFFICE
CERTIFICATE OF CORRECTION

PATENT NO.    : 6,711,160 B2
DATED         : March 23, 2004
INVENTOR(S)   : Nathan Lee et al.

It is certified that error appears in the above-identified patent and that said Letters Patent is hereby corrected as shown below:

Column 2,
Line 4, please insert:
-- The system of this invention may further include an erasable and electrically programmable read only memory, said memory having capacity to be programmed remotely and dynamically. --

Column 3,
Line 54, "interconnections including" should be -- components of the apparatus of --

Column 7,
Lines 32-34, delete "overview configuration of network component interconnections, including the present invention."

Column 11,
Line 18, "far" should be -- for --

Signed and Sealed this

Twenty-eighth Day of June, 2005

JON W. DUDAS
*Director of the United States Patent and Trademark Office*